(12) United States Patent
Kim et al.

(10) Patent No.: US 12,729,073 B2
(45) Date of Patent: Sep. 8, 2026

(54) PROBE CARD GRIPPER AND TRANSFER DEVICE COMPRISING SAME

(71) Applicant: SEMES CO., LTD., Chungcheongnam-do (KR)

(72) Inventors: Da Han Kim, Ulsan (KR); Seung Chan Lee, Hwaseong-si (KR); Ho Young Lee, Yongin-si (KR)

(73) Assignee: SEMES CO., LTD., Chungcheongnam-do (KR)

( * ) Notice: Subject to any disclaimer, the term of this patent is extended or adjusted under 35 U.S.C. 154(b) by 248 days.

(21) Appl. No.: 18/399,392

(22) Filed: Dec. 28, 2023

(65) Prior Publication Data

US 2024/0270511 A1 Aug. 15, 2024

(30) Foreign Application Priority Data

Feb. 14, 2023 (KR) ........................ 10-2023-0019067

(51) Int. Cl.
*B25J 15/00* (2006.01)
*B65G 47/90* (2006.01)

(52) U.S. Cl.
CPC .......... *B65G 47/90* (2013.01); *B25J 15/0052* (2013.01); *B25J 15/0057* (2013.01); *B25J 15/0061* (2013.01)

(58) Field of Classification Search
CPC ......................... B25J 15/0052; B25J 15/0057; B25J 15/0061; B65G 47/90
See application file for complete search history.

(56) References Cited

U.S. PATENT DOCUMENTS

| | | | |
|---|---|---|---|
| 9,685,360 B2 * | 6/2017 | Kinugawa | H10P 72/3221 |
| 2007/0126441 A1 | 6/2007 | Mochizuki et al. | |
| 2016/0185535 A1 | 6/2016 | Kim et al. | |
| 2024/0123630 A1 * | 4/2024 | Lee | B25J 15/0052 |

FOREIGN PATENT DOCUMENTS

| | | |
|---|---|---|
| KR | 10-2007-0057002 | 6/2007 |
| KR | 10-2016-0078612 | 7/2016 |
| KR | 10-2020-0100987 | 8/2020 |

* cited by examiner

*Primary Examiner* — Gerald McClain
(74) *Attorney, Agent, or Firm* — WOMBLE BOND DICKINSON (US) LLP

(57) ABSTRACT

A gripper gripping a plurality of types of probe cards includes a frame, a driving unit connected to the frame, and a plurality of gripper portions connected to the driving unit and including an inner gripper portion and an outer gripper portion. The gripper portions include a moving block moving in a radial direction as the driving unit is driven, and the inner gripper portion and the outer gripper portion connected to the moving block. The outer gripper portion is rotatably connected to the moving block, and is configured such that the outer gripper portion rotates downward with respect to the moving block as the moving block moves in a radial outward direction.

18 Claims, 9 Drawing Sheets

PROBE CARD GRIPPER AND TRANSFER DEVICE COMPRISING SAME

CROSS-REFERENCE TO RELATED APPLICATION(S)

This application claims benefit of priority to Korean Patent Application No. 10-2023-0019067 filed on Feb. 14, 2023 in the Korean Intellectual Property Office, the disclosure of which is incorporated herein by reference in its entirety.

BACKGROUND

1. Field

The present disclosure relates to a gripper gripping a probe card to transfer the probe card and a transfer device including the same.

2. Description of Related Art

To inspect a board, a probe card may be used to connect test equipment and a board.

Such probe cards are transported and installed from the shelf to an inspection device by an operator, or the operator transports the probe cards from the shelf to the inspection device using a transport truck.

In cases in which an operator needs to intervene, various probe cards may be transported, but there is a limitation in that an operator is required, and in the case of probe cards, there are various types depending on the inspection purpose, but the probe cards weigh up to 25 kg, and thus it may be difficult for the operator to hold and transport the probe cards directly.

In the case in which there is no operator, there is a problem that various probe cards cannot be transported with one facility because equipment suitable for each probe card is required.

SUMMARY

An aspect of the present disclosure is to provide a gripper gripping a plurality of types of probe cards and a probe card transfer device including the gripper.

According to an aspect of the present disclosure, the following gripper and probe card transport device are provided.

According to an aspect of the present disclosure, a gripper includes a frame; a driving unit connected to the frame; and a plurality of gripper portions connected to the driving unit and including an inner gripper portion and an outer gripper portion. The gripper portions include a moving block moving in a radial direction as the driving unit is driven, the inner gripper portion and the outer gripper portion are connected to the moving block. The outer gripper portion is rotatably connected to the moving block, and is configured such that the outer gripper portion rotates downward with respect to the moving block as the moving block moves in a radial outward direction.

According to an aspect of the present disclosure, a gripper includes a frame; a driving unit connected to the frame; a plurality of gripper portions connected to the driving unit and including an inner gripper portion and an outer gripper portion; and a rotating plate provided inside the frame and connecting the driving unit and the plurality of gripper portions. The frame includes a guide portion extending in a radial direction from a rotation axis of the rotating plate and guiding movement of the moving block. The gripper portions include a moving block moving along the guide portion by driving the driving unit, and the inner gripper portion and the outer gripper portion connected to the moving block. The outer gripper portion is provided with a first hinge on one end connected to the moving block, and is provided with a bent portion bent inwardly on the other end, and the inner gripper portion is provided with a bent portion bent inwardly. The outer gripper portion is connected to a first pin located lower than the first hinge such that the bent portion of the outer gripper portion rises when the moving block moves inwardly in the radial direction.

According to an aspect of the present disclosure, a probe card transfer device includes a device body; a gripper moving portion provided on the device body, connected to a gripper, and moving the gripper; the gripper connected to the gripper moving portion; and a traveling unit provided on a lower portion of the device body.

BRIEF DESCRIPTION OF DRAWINGS

The above and other aspects, features, and advantages of the present disclosure will be more clearly understood from the following detailed description, taken in conjunction with the accompanying drawings, in which:

FIGS. 6 to 8 are schematic cross-sectional views of the gripper according to the first embodiment, in which FIG. 6 is a cross-sectional view before gripping a probe card, FIG. 7 is a cross-sectional view of holding a probe card of the type with a handle, and FIG. 8 is a cross-sectional view of holding a probe card without a handle;

DETAILED DESCRIPTION

Figure 1:
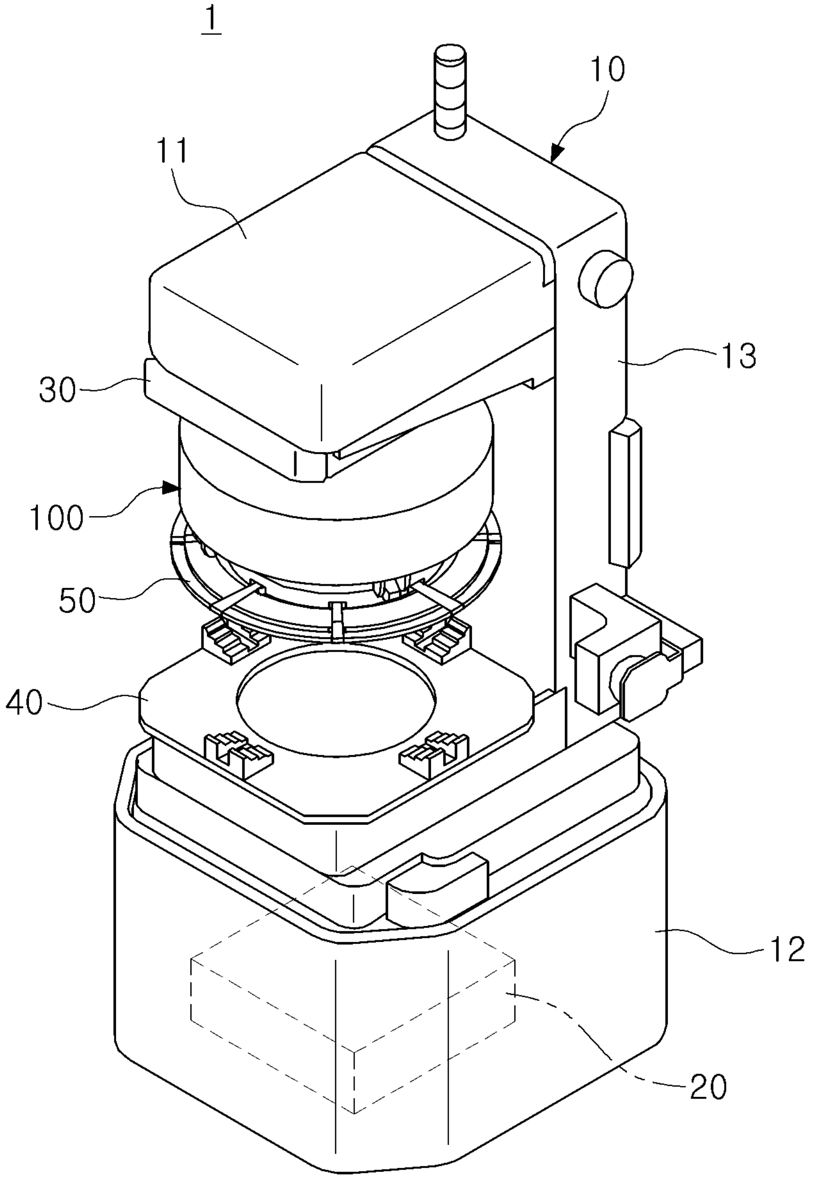
FIG. 1 is a schematic diagram of a probe card transfer device including a gripper according to an embodiment.

Hereinafter, embodiments will be described in detail such that those skilled in the art may easily practice the present disclosure with reference to the accompanying drawings. However, in describing embodiments in detail, if it is determined that a detailed description of a related known function or configuration may unnecessarily obscure the gist of the present disclosure, the detailed description will be omitted. In addition, the same reference numerals are used throughout the drawings for parts having similar functions and actions. In addition, in the present specification, terms such as 'on,' 'upper portion,' 'upper surface,' 'below,' 'lower portion,' 'lower surface,' 'bottom surface', 'side' and the like are based on the drawings, and may be changed depending on the direction in which components are actually disposed.

In addition, throughout the specification, when a portion is said to be 'connected' to another part, it is not only 'directly connected,' but also 'indirectly connected' with other components therebetween. Further, 'including' a certain component means that other components may be further included, rather than excluding other components unless otherwise stated.

FIG. 1 illustrates a schematic diagram of a probe card transfer device including a gripper according to an embodiment.

As illustrated in FIG. 1, a probe card transfer device 1 according to an embodiment includes a device body 10 including a seating portion 40 on which a probe card 50 is seated, a gripper moving portion 30 connected to an upper portion of the device body 10, a gripper 100 connected to the gripper moving portion 30, and a traveling unit 20 provided in a lower portion of the device body 1 to move the device body 1.

The device body 10 includes an upper body 11, a lower body 12, and a connection body 13 connecting the upper body 11 and the lower body 12, and the gripper 100 for holding the probe card 50 is disposed between the upper body 11 and the lower body 12. The gripper moving portion 30 for moving the gripper 100 is connected to the upper body 11, and the gripper moving portion 30 includes a driving unit, a guide rail, and a gripper elevating unit, and moves the gripper 100. For example, the gripper moving portion 30 moves the gripper forward and backward, and also raises/lowers the gripper 100, such that the gripper 100 grips the probe card 50 and moves the probe card to the seating portion 40 of the device body 10, or conversely moves the probe card 50 seated in the seating portion 40 externally.

The traveling unit 20 is disposed in the lower body 12 of the device body 10. The traveling unit 20 may include a driving unit disposed inside the lower body 12 and a wheel connected to the driving unit. By the traveling unit 20, the transfer device 1 may move from one position to another position, and the probe card 50 may be moved to a required position.

Figure 2A:
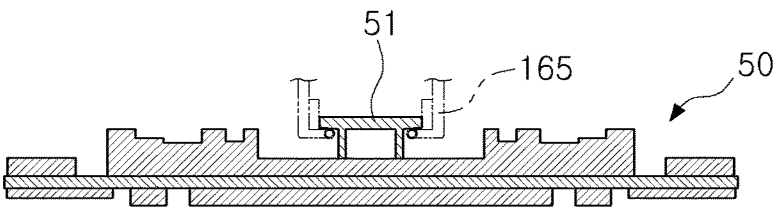
FIGS. 2A and 2B are schematic diagrams of a grip method depending on the type of probe card.
Figure 2B:
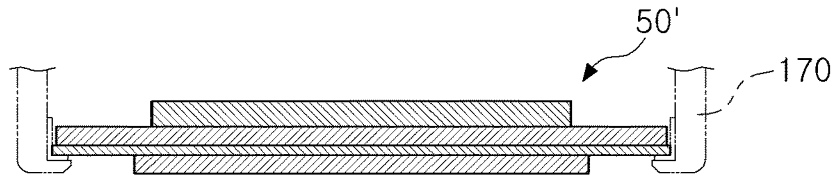

FIGS. 2A and 2B are schematic diagrams of a grip method depending on the type of a probe card.

As illustrated in FIG. 2A, there is a probe card 50 with a handle 51, and there is also a type of probe card 50' without the handle 51 as illustrated in FIG. 2B. In the case of the probe card 50 of a type with the handle 51, the handle 51 located on the inside is held, and in the case of a type of the probe card 50' without the handle 51, the outer side of the probe card 50' is held. The present disclosure provides a gripper that may grip and move the probe card 50 with the handle 51 and the probe card 50' without the handle 51 with a single gripper, and to this end, the gripper 100 includes a gripper portion 150 including an inner gripper portion 165 and an outer gripper portion 170.

Figure 3:
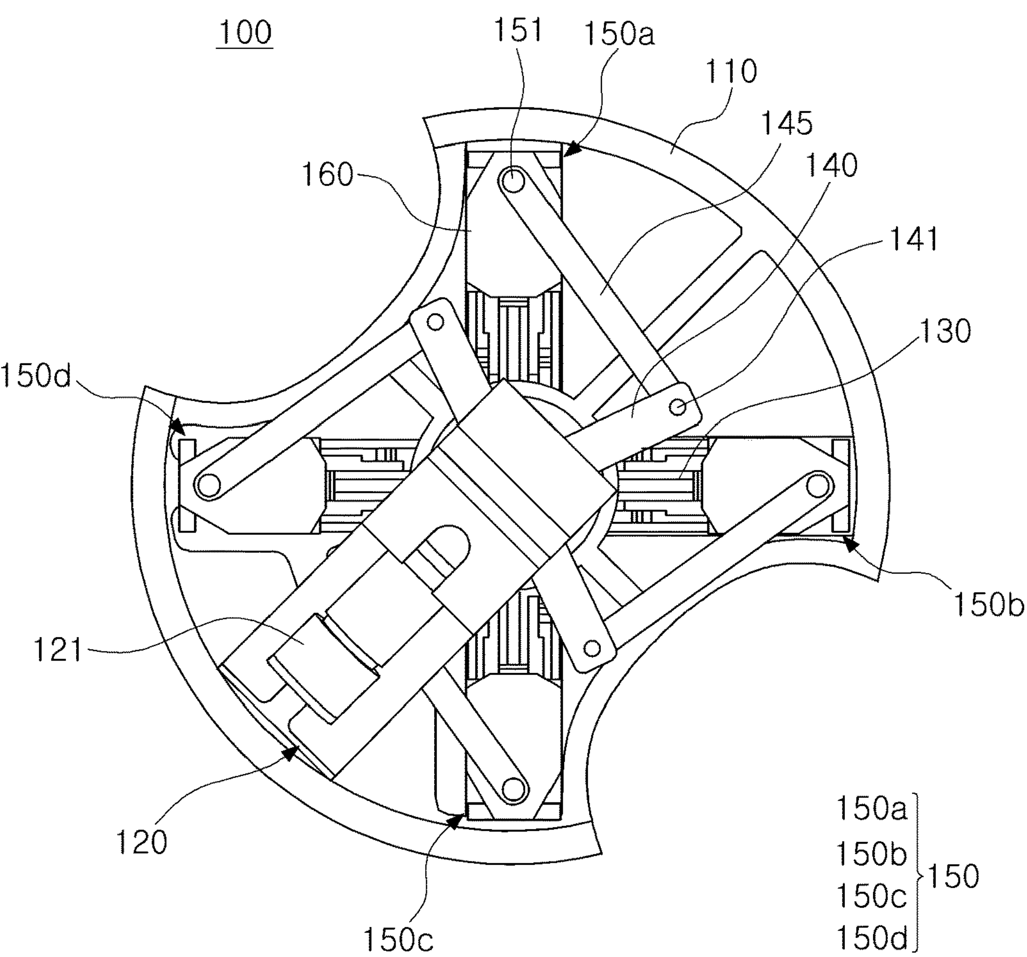
FIGS. 3 and 4 are plan views of a gripper according to a first embodiment.
Figure 4:
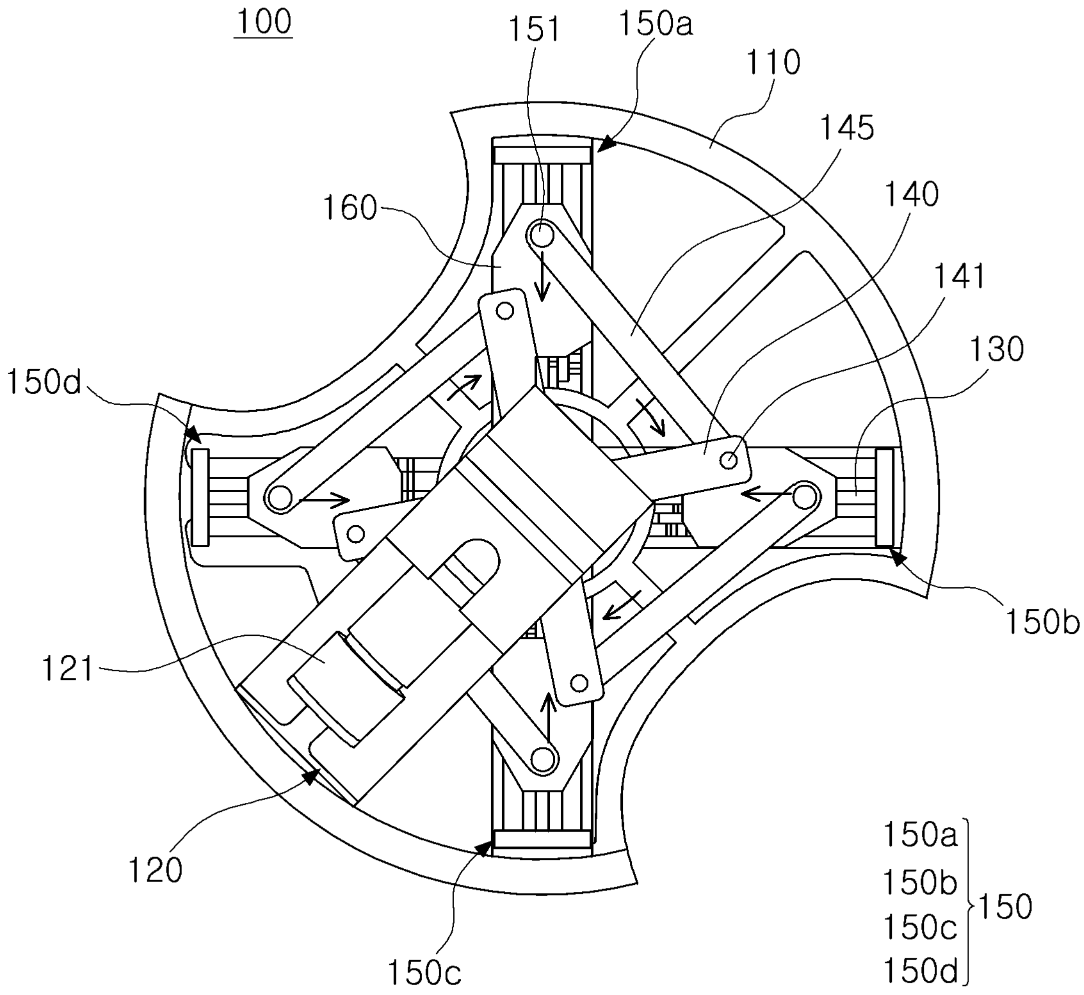
Figure 5:
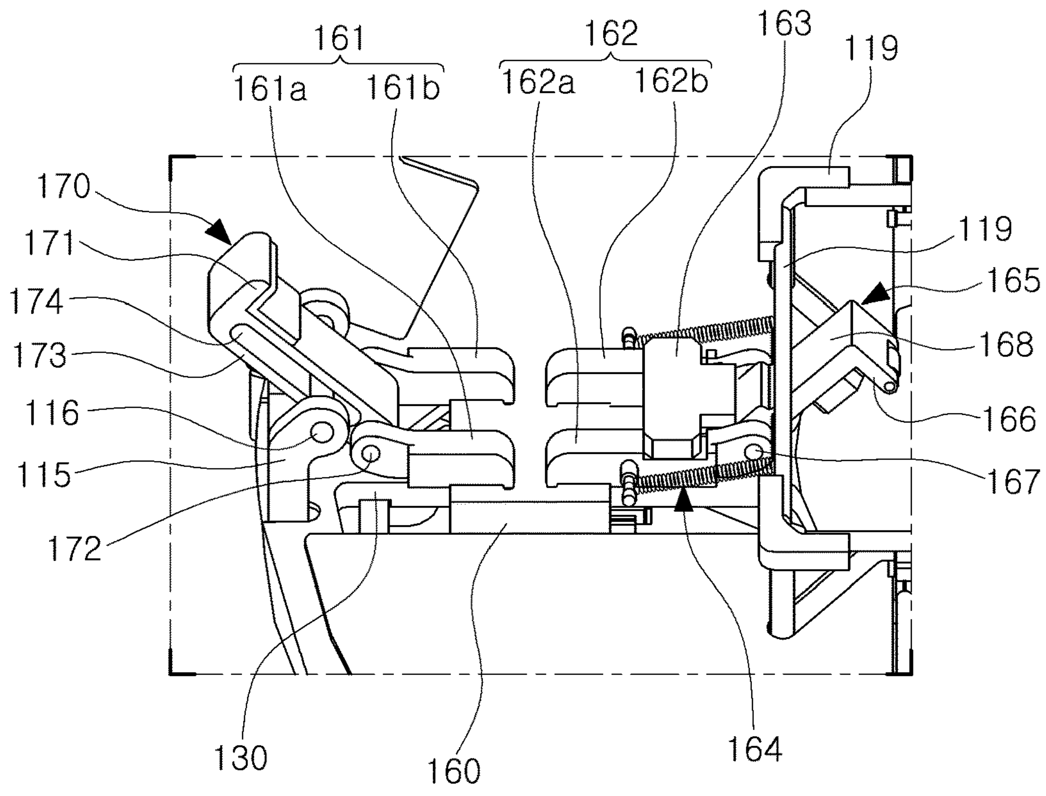
FIG. 5 is a partial bottom perspective view of the gripper according to the first embodiment.
Figure 6:
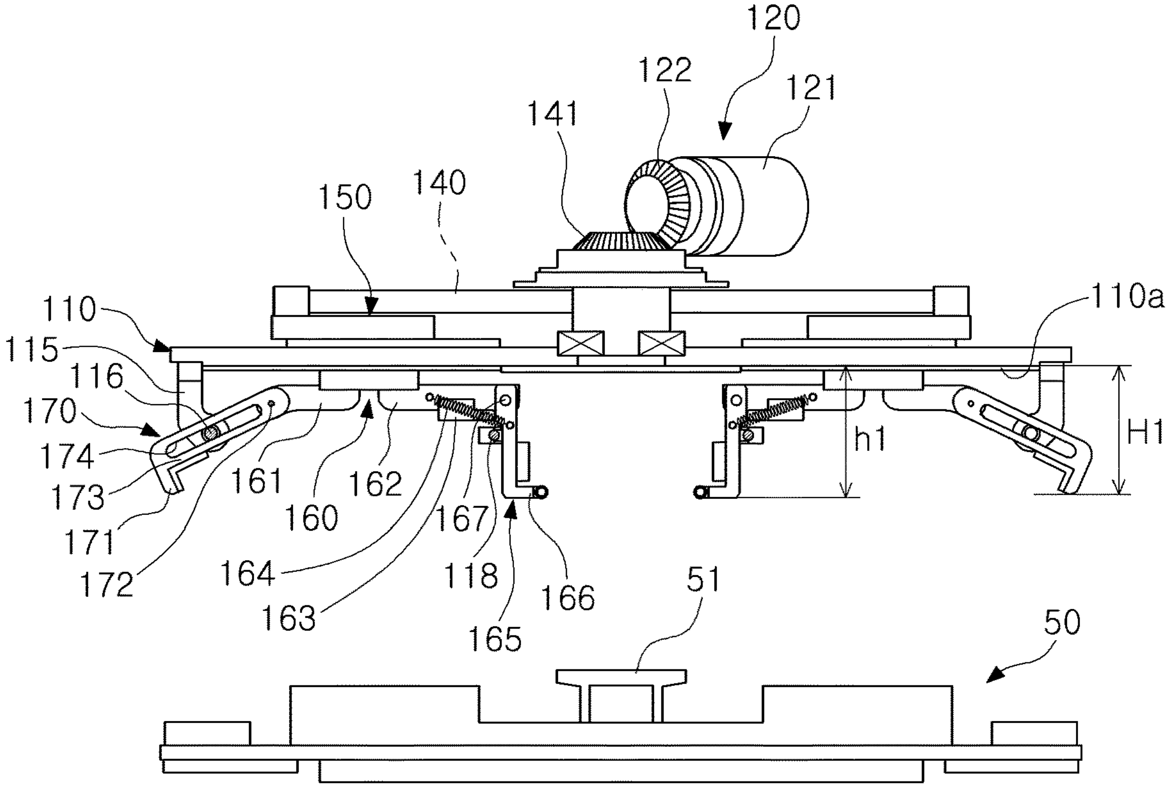
Figure 7:
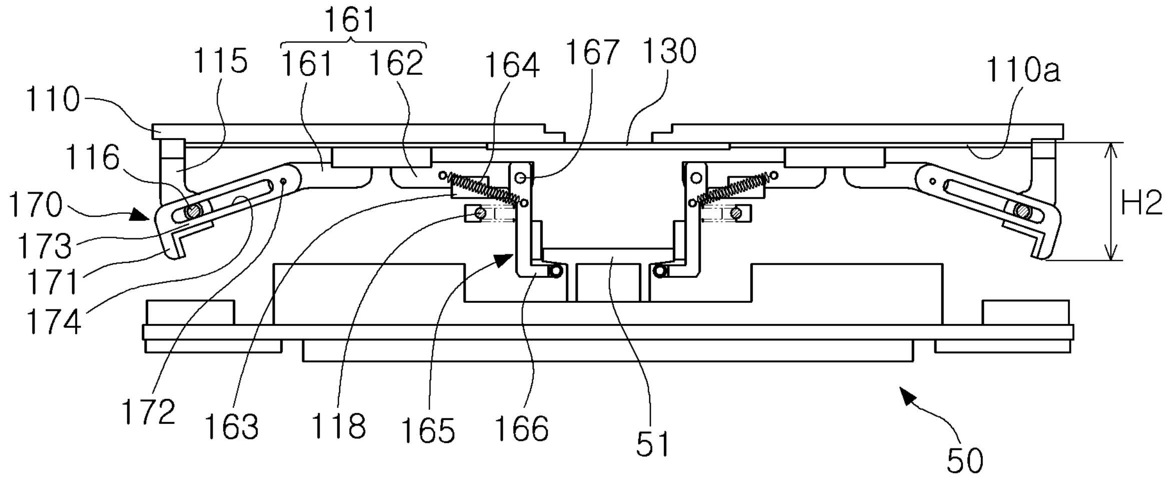
Figure 8:
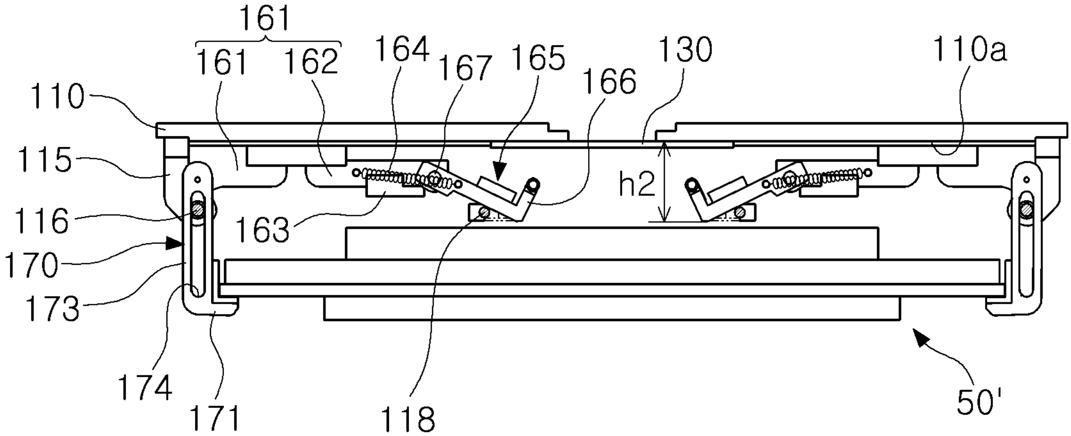

FIGS. 3 and 4 illustrate a plan view of the gripper 100 according to a first embodiment, FIG. 5 illustrates a partial bottom perspective view of the gripper according to the first embodiment, and FIGS. 6 to 8 illustrate schematic cross-sectional views of a gripper according to THE first embodiment.

The gripper 100 according to an embodiment includes a frame 110 forming the outer shape of the gripper 100, a driving unit 120 connected to the frame 110, and a plurality of gripper portions 150 connected to the driving unit 120 and including the inner gripper portion 165 and the outer gripper portion 170. The gripper portion 150 includes a moving block 160 that moves in the radial direction according to the driving of the driving unit 120, and the inner gripper portion 165 and the outer gripper portion 170 connected to the moving block 160. The outer gripper portion 170 is rotatably connected to the moving block 160, and the outer gripper portion 170 is configured to rotate downward with respect to the moving block 160 as the moving block 160 moves radially outward.

The frame 110 forms a structure that has an outer shape with a radius larger than a radius of the probe card 50 and corresponds to the radial and circumferential directions of the probe card, and is formed in a structure having a height that allows the driving unit 120 to be disposed inside in the vertical direction. The inner gripper portion 165 and the outer gripper portion 170 of the gripper portion 150 are disposed on the lower portion of the frame 110.

A rotating plate 140 is disposed in the inner center of the frame 110, and the rotating plate 140 is rotatably connected to the frame 110. In the frame 110, an LM guide 130 extending in the radial direction about the rotation axis of the rotating plate 140 is disposed in a position lower than the rotating plate 140. Four LM guides 130 are disposed at 90° intervals around the rotation axis, and the gripper portion 150 is connected to the LM guide 130 to move along the LM guide 130.

The driving unit 120 is installed inside the frame 110 and may include a motor 121 disposed toward the center of the frame 110. However, the driving unit 120 is not limited to a motor and may be other driving units such as a cylinder.

The rotation axis of the motor 121 is disposed to be parallel to the horizontal plane, and first bevel gear 122 is connected to the end of the motor 121. The first bevel gear 122 is engaged with a second bevel gear 141 connected to the rotating plate 140 provided on the center of the frame 110. Accordingly, as the motor 121 is driven, the rotating plate 140 may rotate clockwise or counterclockwise when viewed from a plane.

In this embodiment, the rotating plate 140 protrudes in a cross shape on a plane, but is not limited thereto, and may be formed in various shapes, such as a circular shape, a quadrangular shape, and the like. A plurality of hinges 141 are provided on the outer side of the rotating plate 140. For example, the plurality of hinges 141 are provided in positions spaced apart from the rotation axis of the rotating plate 140. The hinge 141 is connected to a link 145, and the rotating plate 140 is connected to a gripper portion 150 through the link 145. The rotating plate 140 includes the hinges 141 of the number corresponding to the number of the links 145 connected to the gripper portion 150.

The gripper portion 150 includes the moving block 160 configured to move along the LM guide 130, the inner gripper portion 165 located inside the moving block 160 in the radial direction, and the outer gripper portion 170 located outside the moving block 160 in the radial direction. The gripper portion 150 is provided in plural pieces to correspond to the LM guide 130, and in this embodiment, the gripper portion 150 includes first to fourth gripper portions 150_a_, 150_b_, 150_c_, and 150_d_. The first to fourth gripper portions 150_a_, 150_b_, 150_c_, and 150_d_ have the same structure.

The moving block 160 is connected to the rotating plate 140 through the link 145. FIG. 4 illustrates the rotating plate 140 rotated clockwise In FIG. 3, and the moving block 160 moves radially inward along the LM guide 130 by clockwise rotation of the rotating plate 140. Conversely, when the rotating plate 140 is rotated counterclockwise in the state illustrated in FIG. 4, the state illustrated in FIG. 3 is obtained, and the moving block 160 moves outward in the radial direction.

A portion of the moving block 160 is located inside the frame 110, and the other part protrudes downwardly of the frame 110. The moving block 160 is provided with an inner extension portion 162 extending radially inward and an outer extension portion 161 extending radially outward on the lower surface, and a hinge 151 to which the end of the link 145 is connected is provided on the upper surface of the moving block 160.

The outer extension portions 161 are provided as a pair, and the outer gripper portion 170 is rotatably connected between a pair of outer extension portions 161*a* and 161*b*. For example, a pair of outer extension portions 161*a* and 161*b* are connected to a first hinge 172 provided on one end of the outer gripper portion 170, such that the outer gripper portion 170 is rotatably connected to the outer extension portion 161. In this embodiment, the first hinge is composed of a pin penetrating the pair of outer extension portions 161*a* and 161*b* and a through-hole formed in the outer gripper portion 170, but the present disclosure is not limited thereto. The hinge structure may be obtained in a variety of manners.

Similarly, the inner extension portion 162 is provided as a pair, and the inner gripper portion 165 is rotatably connected between a pair of inner extension portions 162*a* and 162*b*. A second hinge 167 provided on one end of the inner gripper portion 165 is connected to the pair of inner extension portions 162*a* and 162*b*. The first and second hinges 172 and 167 allow rotation about a rotation axis perpendicular to the radial direction on a plane.

A limit block 163 is disposed on the lower portion of the inner extension portion 162, to limit the rotation of the inner gripper portion 165, and the limit block 165 is disposed on the lower rear of the second hinge 167 to prevent the extension direction of the inner gripper portion 165 from rotating beyond the vertical direction.

Therefore, as the moving block 160 moves, the inner and outer gripper portions 165 and 170 move along the moving block 160, while the inner and outer gripper portions 165 and 170 may be rotated relative to the moving block 160.

The inner gripper portion 165 is provided with the second hinge 167 on one end in the extension direction, and a bent portion 166 for holding the probe card 50 may be provided on the other end. The bent portion 166 of the inner gripper portion 165 is for gripping the handle 51 of the probe card 50, and may be provided with a groove (not illustrated) perpendicular to the radial direction on the plane, to correspond to the case in which the handles 51 of the probe card 50 are provided as a pair.

On the other hand, a connecting portion 119 extending downward from the bottom surface 110*a* of the frame 110 is disposed on the bottom surface of the frame 110, to space the guide pin 118 from the bottom surface 110*a* of the frame. The guide pin 118 extends in the same direction as the rotation axis of the second hinge 167, and guide pins 118 corresponding to respective gripper portions 150*a*, 150*b*, 150*c* and 150*d* form a quadrangular shape. The connecting portions 119 are disposed at the corners of the quadrangular shape formed by the four guide pins 118.

The guide pin 118 is located lower than the second hinge 167, but is located radially outside the bent portion 166 of the inner gripper portion 165. The positional relationship between the guide pin 118 and the second hinge 167 changes according to the radial movement of the moving block 150, and when the moving block 150 moves to the inner end, the second hinge 167 is located more inwardly than the guide pin 118, and when the moving block 150 moves to the outer end, the second hinge 167 is located more outwardly than the guide pin 118.

The gripper portion 150 includes an elastic member 164 connecting the inner extension portion 162 and the inner gripper portion 165. The elastic member 164 may be a spring, but is not limited thereto. Other configurations, for example elastic bands, may also be used as long as they may provide an elastic force that pulls the inner gripper portion 165 toward the inner extension portion 162.

The elastic member 164 connects a first point on the inner gripper portion 165, spaced apart from the second hinge 167, and a second point on the inner extension portion 162, radially more outer than a position connected to the second hinge 167, and thus, a distance between the second hinge 167 and the first point is less than a height difference between the second hinge 167 and the guide pin 118. Accordingly, above the guide pin 118, the elastic member provides an elastic force that pulls the inner gripper portion 165 toward the second point.

When the second hinge 167 moves radially more outwardly than the guide pin 118 due to movement of the moving block 160, the inner gripper portion 165 rotates along the guide pin 118 such that the bent portion 166 faces the center of the frame 110. As the inner gripper portion 165 rotates, the distance from the bottom of the frame 110 to a lowermost end of the inner gripper portion 165 may become shorter, and thus, when the outer gripper portion 170 grips the probe card 50', interference between the inner gripper portion 165 and the probe card 50 may be avoided. Therefore, in order for the outer gripper portion 170 to stably hold the probe card 50', the distance at which a bent portion 171 of the outer gripper portion 170 is spaced apart from the bottom of the frame 110 may be relatively short, thereby miniaturizing the gripper 100. The operation of the inner gripper portion 165 according to the moving block 160 will be described again with reference to FIGS. 6 to 8 later.

The outer gripper portion 170 is provided with the first hinge 172 on one end, and the bent portion 171 for holding the probe card 50 is provided on the other end. The outer gripper portion 170 includes a through-groove 174 penetrating a body 173 formed in the extension direction, and the through-groove 174 is formed long in the extending direction in the body 173.

On the other hand, the frame 110 includes a first pin 116 passing through the through-groove 174 and a bracket 115 on which the first pin 116 is mounted. The bracket 115 is provided on the outer edge of the bottom surface 110*a* of the frame 110, and the first pin 116 is configured to be spaced a certain distance apart from the bottom surface 110*a*. The first pin 116 extends parallel to the guide pin 118. The first pin 116 is located to be lower than the first hinge 172. Therefore, when the moving block 160 moves outward in the radial direction, the first hinge 172 approaches the first pin 116, and the outer gripper portion 170 is rotated such that the bent portion 171 of the outer gripper portion 170 faces inward in the radial direction.

The operation of the gripper portion 150 will be described with reference to FIGS. 6 to 8. FIG. 6 illustrates a schematic cross-sectional view before holding the probe card 50. FIG. 7 illustrates a cross-sectional view of holding the probe card 50 of the type with a handle 51. FIG. 8 illustrates a cross-sectional view of holding a handle-less type probe card 50'.

As illustrated in FIG. 6, before gripping the probe card 50, the gripper 100 is in a state in which the inner gripper portion 165 is standing in the vertical direction, and the outer gripper portion 170 is rotated outward by the first pin 116. In this state, the outer surface of the inner gripper portion 165 is in contact with the limit block 163.

In this state, the gripper 100 is moved downward by the gripper moving portion 30 (see FIG. 1).

To hold the probe card 50 with the handle 51, the rotating plate 140 is rotated by the driving unit 120, and the moving block 160 of the gripper portion 150, which is connected to the rotating plate 140 by a link 145, moves inward and grips the handle 51 with the inner gripper portion 165 as illustrated in FIG. 7. To grip the probe card 50' without the handle 51, the moving block 160 of the gripper portion 150 moves outward and holds an external surface of the probe card 50' with the outer gripper portion 170 as illustrated in FIG. 8.

As illustrated in FIG. 7, when the moving block 160 of the gripper portion 150 moves inward to grip the probe card 50 with the handle 51, the inner gripper portion 165 is supported by the limit block 163, for example, the inner gripper portion 165 moves inward while maintaining a vertical state and grips the handle 51. At this time, as the moving block 160 moves inward, the distance between the first pin 116 and the first hinge 172 increases and the outer gripper portion 170 rotates outward. As the outer gripper portion 170 rotates outward, the distance from the bottom surface 110*a* of the frame 110 to the lowermost end of the outer gripper portion 170 gradually becomes gradually shorter. Thus, when gripping the probe card 50 with the inner gripper portion 165, interference between the outer gripper portion 170 and the probe card 50 is avoided (H1>H2).

Conversely, as illustrated in FIG. 8, when the moving block 160 of the gripper portion 150 moves outward to grip the probe card 50' without the handle 50, as the distance between the first pin 116 and the first hinge 172 decreases, the outer gripper portion 170 rotates inward and thus the bent portion 171 grips the outer surface of the probe card 50'.

In addition, as the moving block 160 of the gripper portion 150 moves outward, the inner gripper portion 165 is rotated inward as the outer side surface of the inner gripper portion 165 contacts the guide pin 118. As the inner gripper portion 165 rotates inward, the distance from the bottom surface 110*a* of the frame 110 to the lowermost end of the inner gripper portion 165 gradually becomes shorter, and when gripping the probe card 50' with the outer gripper portion 170, interference between the inner gripper portion 165 and the probe card 50' is avoided (h1>h2).

In this embodiment, the moving block 160 of the gripper portion 150 may grip various types of probe cards 50 and 50' while moving radially inward or outward along the LM guide 130. In detail, the outer gripper portion 170 rises when the inner gripper portion 165 grips a probe card, and when gripping by the outer gripper portion 170 is required, the outer gripper portion 170 rotates around the first hinge 172 and moves lower than the inner gripper portion 165, thereby holding various types of probe cards 50 and 50'.

In addition, not only the outer gripper portion 170, but also the inner gripper portion 165 is raised to avoid interference with the probe card 50' held by the outer gripper portion 170 when the outer gripper portion 170 comes down, so that the distance that the outer gripper portion 170 comes down may be relatively small, and the rotation radius of the outer gripper portion 170 becomes smaller, the overall size of the gripper 100 may be reduced.

In addition, the outer gripper portion 170 and the inner gripper portion 165 are connected to one moving block 160 and may thus not only operate with one power source, but also the structure of the gripper 100 may be simplified, and the control factor for gripping is small, which is also advantageous for automation.

Figure 9:
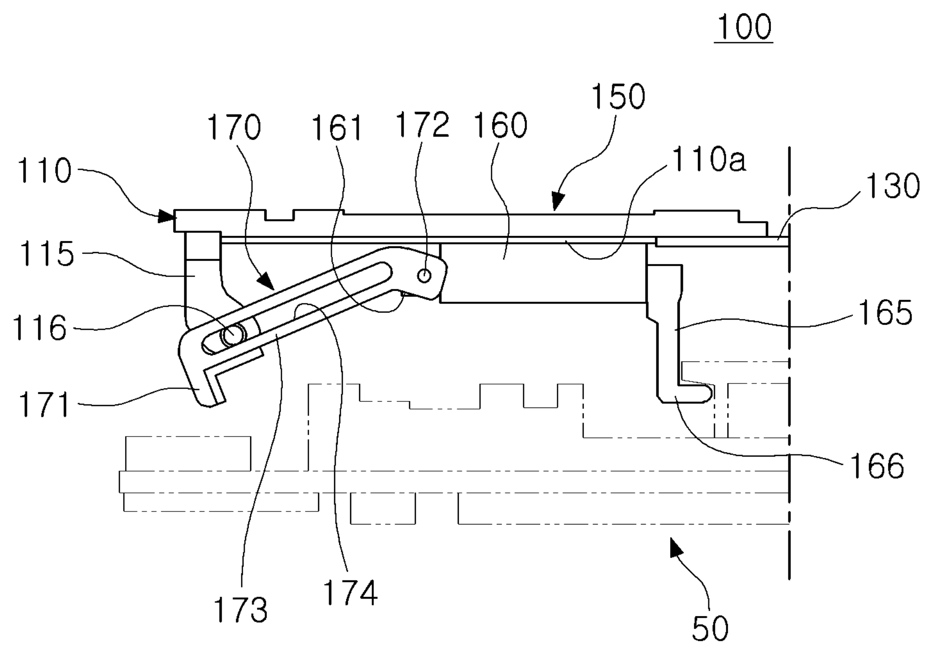
FIGS. 9 and 10 are schematic cross-sectional views of a gripper according to a second embodiment.
Figure 10:
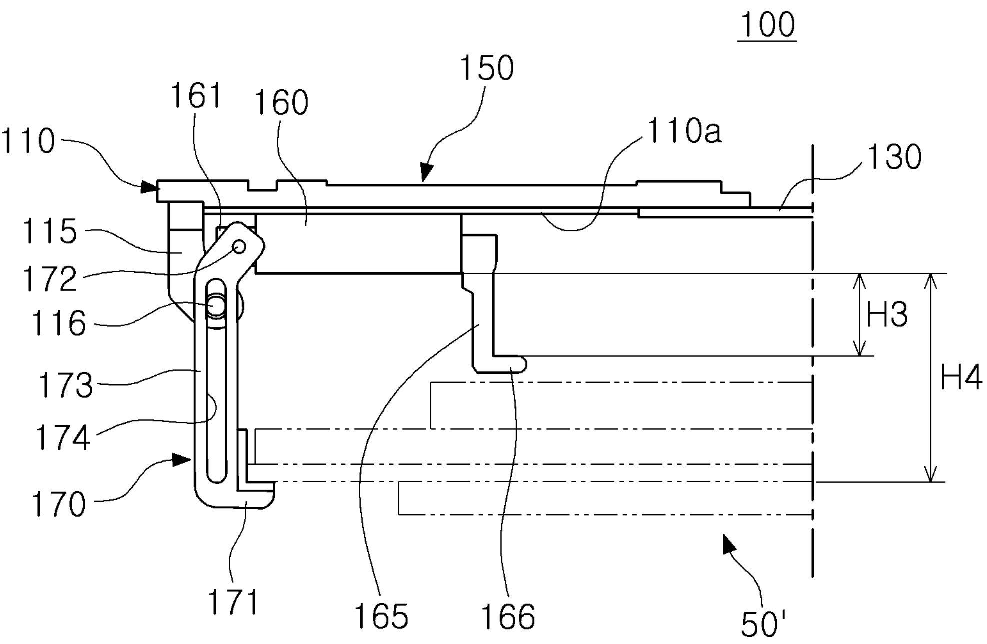

FIGS. 9 to 10 illustrate a schematic cross-sectional view of a gripper portion 150 of a gripper 100 according to a second embodiment. In detail, FIG. 9 illustrates a schematic cross-sectional view when a probe card 50 is held by an inner gripper portion 165. FIG. 10 illustrates a schematic cross-sectional view when a probe card 50' is held by an outer gripper portion 170.

Since the remaining basic structures not illustrated in the second embodiment are the same as those in the first embodiment, the description will focus on the differences.

The second embodiment is the same as the first embodiment in that the inner gripper portion 165 and the outer gripper portion 170 of the gripper portion 150 are connected to the moving block 160 and the moving block 160 moves along the LM guide 130. However, the difference is that the inner gripper portion 165 is not connected to the moving block 160 by a hinge, but is fixed to the moving block 160.

In this embodiment, the outer gripper portion 170 is provided with a first hinge 172 on one end and is provided with a bent portion 171 for holding the probe card 50 on the other end. The outer gripper portion 170 includes a through-groove 174 penetrating a body 173 formed in the extension direction, and the through-groove 174 is formed long in the extending direction in the body 173.

The frame 110 includes a first pin 116 that passes through the through-hole 174 and a bracket 115 on which the first pin 116 is mounted. The bracket 115 is provided on the outer edge of the bottom surface 110*a* of the frame 110, and is configured such that the first pin 116 is spaced a certain distance apart from the bottom surface 110*a*. The first pin 116 is located lower than the first hinge 172, and as the first hinge 172 approaches the first pin 116 by the movement of the moving block 160 outward in the radial direction, the outer gripper portion 170 is rotated such that the bent portion 171 of the outer gripper portion 170 faces inward in the radial direction.

In this embodiment, since the inner gripper portion 165 moves together with the moving block 160 while being fixed to the moving block 160, the outer gripper portion 170 is configured such that a distance H4 from the bottom surface 110*a* of the frame 110 to the bent portion 171 of the outer gripper portion 170 is greater than a distance H3 from the bottom surface 110*a* of the frame 110 to the bent portion 166 of the inner gripper portion 165 (H4>H3) when the outer gripper portion 170 grips the probe card 50'.

In this embodiment, various types of probe cards 50 and 50' may be held by a simple structure, and when gripping the probe card 50 with the inner gripper portion 165, the outer gripper portion 170 rises to avoid interference between the outer gripper portion 170 and the probe card 50, and when gripping the probe card 50 with the outer gripper portion 170, the outer gripper portion 170 may move sufficiently lower than the inner gripper portion 165 to avoid interference between the probe card 50' and the inner gripper portion 165.

Figure 11:
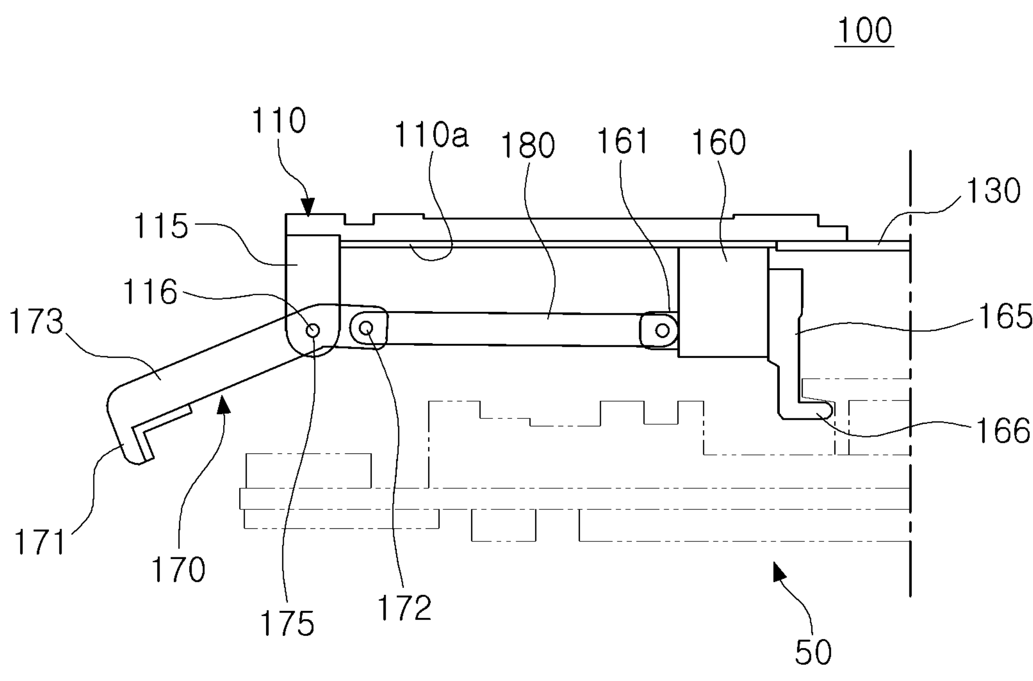
FIGS. 11 and 12 are schematic cross-sectional views of a gripper according to a third embodiment.
Figure 12:
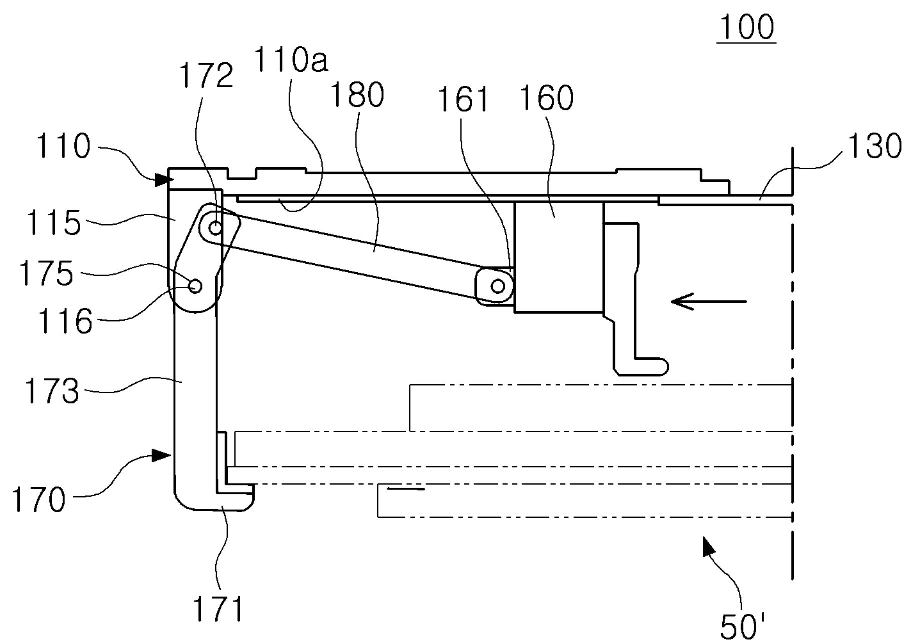

FIGS. 11 and 12 illustrate schematic cross-sectional views of a third embodiment. In detail, FIG. 11 illustrates a schematic cross-sectional view when the probe card 50 is held by the inner gripper portion 165, and FIG. 12 illustrates a schematic cross-sectional view when the probe card 50' is held by the outer gripper portion 170.

Similar to the second embodiment, the remaining basic structures not illustrated in the third embodiment are the same as those of the first embodiment, and thus the description thereof will focus on the differences.

In the third embodiment, as in the second embodiment, the inner gripper portion 165 and the outer gripper portion

170 of the gripper portion 150 are connected to the moving block 160, and the moving block 160 moves along the LM guide 130, and the inner gripper portion 165 is not hinged to the moving block 160, but is fixed to the moving block 160.

In this embodiment, the outer gripper portion 170 is provided with a first hinge 172 on one end and is provided with a bent portion 171 for holding the probe card 50 on the other end. The first hinge 172 of the outer gripper portion 170 is connected to the outer extension portion 161 of the moving block 160 through a link 180. In addition, the body 173 of the outer gripper portion 170 is hinged and connected to the first pin 116 installed on the bracket 115 of the frame 110 in a position spaced apart from the first hinge 172.

The first pin 116 is located lower than the first hinge 172, and as the moving block 160 moves outward in the radial direction and approaches the first pin 116, the link 180 rotates upward, and the outer gripper portion 170 is rotated such that the bent portion 171 of the outer gripper portion 170 faces inward in the radial direction.

In this embodiment, since the inner gripper portion 165 moves together with the moving block 160 while being fixed to the moving block 160, the outer gripper portion 170 is configured such that the distance from the bottom surface **110*a* of the frame 110 to the bent portion 171 of the outer gripper portion 170 is greater than the distance from the bottom surface 110*a* of the frame 110 to the bent portion 166 of the inner gripper portion 165 when the outer gripper portion 170 grips the probe card 50'**.

In this embodiment, also, various types of probe cards 50 and 50' may be held through a simple structure, and when gripping the probe card 50 with the inner gripper portion 165, the outer gripper portion 170 rises to avoid interference between the outer gripper portion 170 and the probe card 50, and when gripping the probe card 50 with the outer gripper portion 170, the outer gripper portion 170 is sufficiently lower than the inner gripper portion 165 to avoid interference between the probe card 50' and the inner gripper portion 165.

Figure 13:
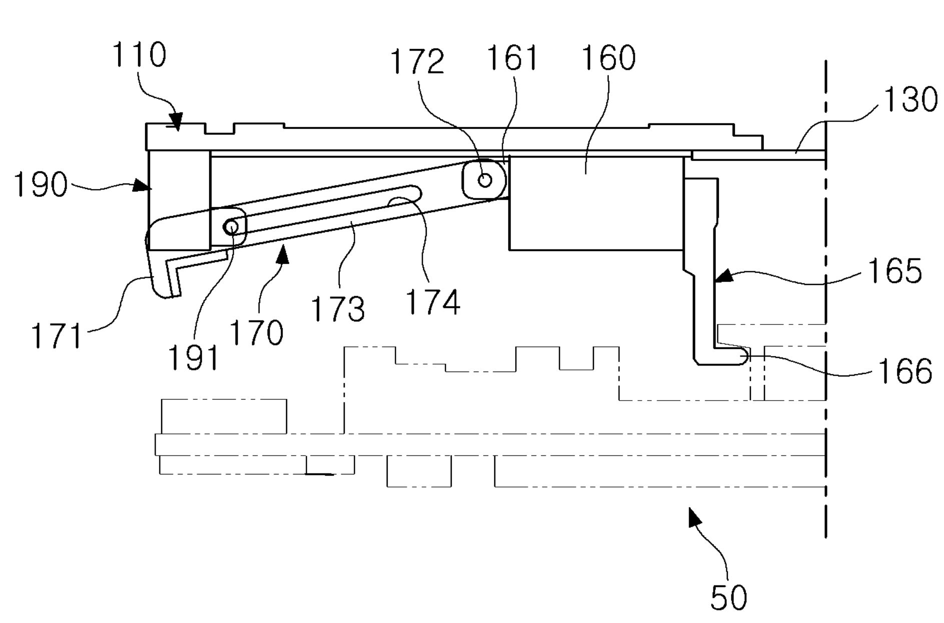
FIGS. 13 and 14 are schematic cross-sectional views of a gripper according to a fourth embodiment.
Figure 14:
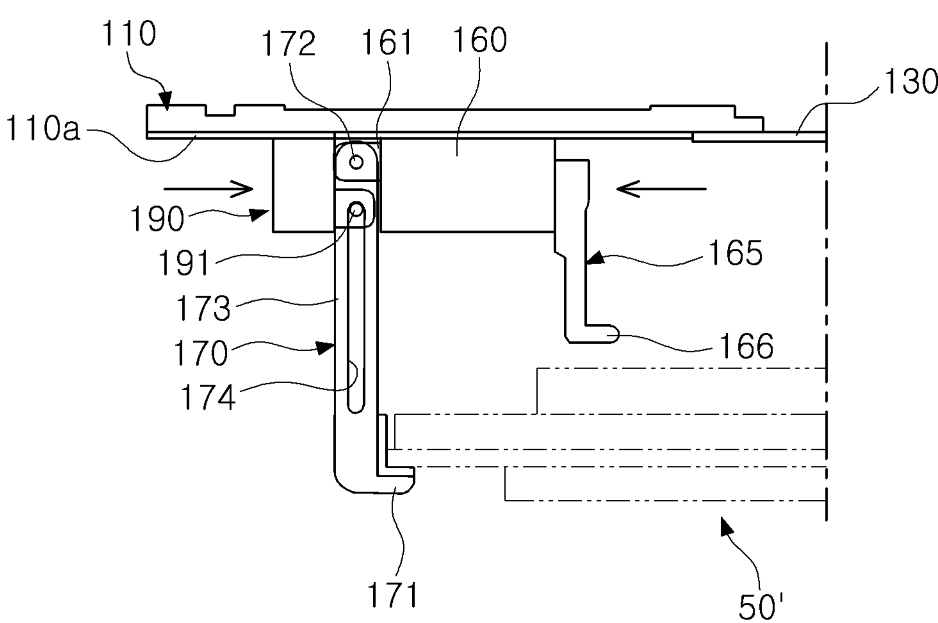
Figure 15A:
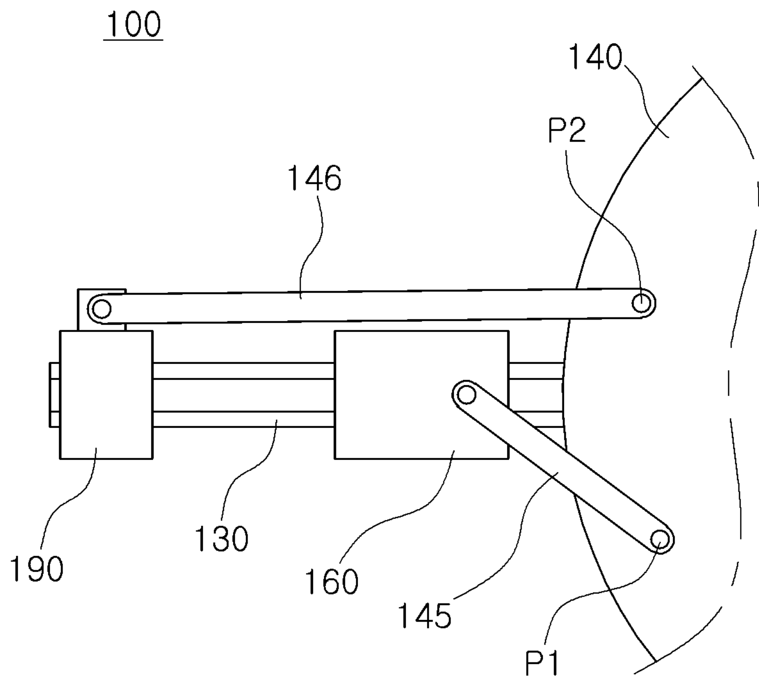
FIGS. 15A and 15B are schematic plan views of a gripper according to the fourth embodiment.
Figure 15B:
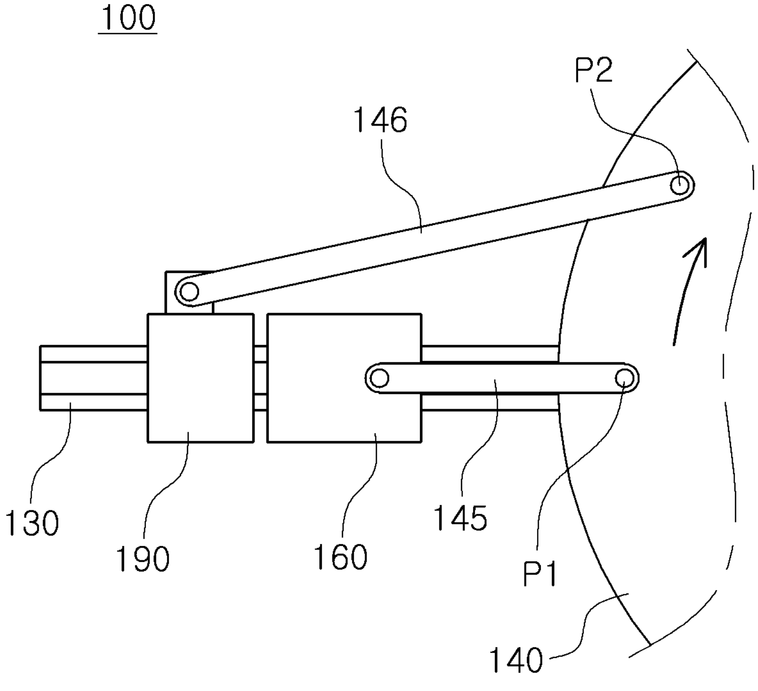

FIGS. 13 to 15B illustrate a schematic cross-sectional view and a top view of a gripper according to a fourth embodiment. In detail, FIG. 13 illustrates a schematic cross-sectional view when the probe card 50 is held by the inner gripper portion 165, and FIG. 14 illustrates a schematic cross-sectional view when the probe card 50' is held by the outer gripper portion 170. FIG. 15A illustrates a schematic plan view when the probe card 50 is held by the inner gripper portion 165, and FIG. 15B illustrates a schematic plan view when the probe card 50' is held by the outer gripper portion 170.

The remaining basic structure, which is not illustrated in the fourth embodiment, is the same as the first embodiment.

As illustrated in FIGS. 13 to 15B, in the fourth embodiment, in a gripper portion 150 of a gripper 100, two moving blocks 160 and 190, instead of one moving block 160, are connected to the LM guide 130. For example, the gripper portion 150 includes the moving block 160 and an additional moving block 190, moving along the LM guide 130. Although the LM guide 130 is illustrated as one, the gripper 100 may include a plurality of LM guides 130 corresponding to respective moving blocks 160 and 190.

As a plurality of moving blocks 160 and 190 are provided, the number of links 145 and 146 connected to the rotating plate 140 is also provided corresponding to the number of moving blocks 160 and 190. However, points P1 and P2 on which the links 145 and 146 are connected on the rotating plate 140 are located in different locations, such that the moving block 160 and the additional moving block 190 may be moved in different directions according to the rotation of the rotating plate 140. For example, when the rotating plate 140 is rotated clockwise, the moving block 160 moves radially outward and the additional moving block 190 moves radially inward. Conversely, when the rotating plate 140 is rotated counterclockwise, the moving block 160 moves radially inward, and the additional moving block 190 moves radially outward.

An inner gripper portion 165 and an outer gripper portion 170 are connected to the moving block 160, and the inner gripper portion 165 is fixed to the moving block 160 and moves together without rotating with respect to the moving block 160.

A first hinge 172 is provided on one end of the outer gripper portion 170, and connected to the outer extension portion 161 of the moving block 160, and a bent portion 171 for holding the probe card 50 is provided on the other end thereof. In addition, a through-groove 174 is formed in the body 173 of the outer gripper portion 170, in the extending direction of the outer gripper portion 170, and the second pin 119 connected to the additional moving block 190 passes through the through-groove 174. The first hinge 172 is located closer to the bottom surface **110*a* of the frame 110 than the second pin 119**.

Since the additional moving block 190 and the moving block 160 move in opposite directions due to the rotation of the rotating plate 140, as the rotating plate 140 rotates, the change in distance between the first hinge 172 and the second pin 119 may increase, such that the size of the rotating plate 140 may be reduced. Additionally, since the rotation speed of the outer gripper portion 170 increases, and the outer gripper portion 170 rises quickly, and when the probe card 50 is held by the inner gripper portion 165, avoiding interference between the outer gripper portion 170 and the probe card 50 may be facilitated. In addition, since the additional moving block 19 is moved, the space occupied by the gripper 100 due to the rotation of the outer gripper portion 170 may be relatively reduced, and thus the gripper 100 may also be miniaturized.

As set forth above, according to an embodiment, through the above configuration, a gripper gripping a plurality of types of probe cards and a probe card transfer device including the gripper may be provided.

While example embodiments have been illustrated and described above, it will be apparent to those skilled in the art that modifications and variations could be made without departing from the scope of the present disclosure as defined by the appended claims.

What is claimed is:

1. A gripper comprising:

a frame;

a driving unit connected to the frame; and a plurality of gripper portions connected to the driving unit and including an inner gripper portion and an outer gripper portion, wherein the gripper portions include a moving block moving in a radial direction as the driving unit is driven, and the inner gripper portion and the outer gripper portion connected to the moving block, and the outer gripper portion is rotatably connected to the moving block, and is configured such that the outer gripper portion rotates downward with respect to the moving block as the moving block moves in a radial outward direction a carriage return and indent wherein the outer gripper portion is provided with a first hinge on one end connected to the moving block, and is provided with a bent portion bent inwardly on the other end, and the frame includes a guide portion extending in the radial direction and guiding the moving block, and, wherein the frame is provided with a rotating plate on a center thereof, and the driving unit is connected to the moving block of the plurality of gripper portions through the rotating plate.

2. The gripper of claim 1, wherein a link is provided between the rotating plate and the moving block.

3. The gripper of claim 2, wherein the outer gripper portion includes a through-groove provided in an extension direction of the outer gripper portion, and the frame includes a first pin passing through the through-groove, wherein the first pin is disposed lower than the moving block.

4. The gripper of claim 2, wherein the gripper portion includes an additional moving block moving radially along the guide portion as the rotating plate rotates, the outer gripper portion includes a through-groove provided in an extension direction of the outer gripper portion, the additional moving block includes a second pin passing through the through-groove, and the additional moving block and the moving block move in opposite directions in the radial direction as the rotating plate rotates.

5. The gripper of claim 3, wherein the inner gripper portion is provided with a second hinge on one end connected to the moving block, and is provided with a bent portion bent inward, on the other end, and the frame is located lower than the second hinge of the inner gripper portion and includes a plurality of guide pins located further outside than the other end of the inner gripper portion in the radial direction.

6. The gripper of claim 5, wherein an upper surface of the bent portion of the inner gripper portion is provided with a groove formed in a direction, perpendicular to the radial direction in a plane.

7. The gripper of claim 5, wherein the plurality of guide pins are connected to each other by a connecting portion extending downward from a lower surface of the frame, the moving block includes an elastic member connecting a first point in the inner gripper portion spaced apart from the second hinge and a second point in the moving block spaced apart from the second hinge, and a distance between the second hinge and the first point is less than a height difference between the second hinge and the guide pin.

8. The gripper of claim 7, wherein the moving block further includes a limit block disposed radially further outside than the second hinge of the inner gripper portion and limiting an outer rotation of the inner gripper portion.

9. The gripper of claim 8, wherein the moving block includes a body moving along the guide portion, an inner extension portion extending radially inward from the body, and an outer extension portion extending radially outward, the first hinge of the outer gripper portion is connected to the outer extension portion, the second hinge of the inner gripper portion is connected to the inner extension portion, and the moving block is moved between a first position in which the second hinge is located radially further inwardly than the guide pin and a second position in which the second hinge is located radially further outwardly than the guide pin.

10. The gripper of claim 9, wherein, when the moving block is in the first position, the first hinge is located radially further inwardly than the first pin.

11. The gripper of claim 1, wherein the driving unit includes a first bevel gear, and the rotating plate is connected to a second bevel gear meshing with the first bevel gear.

12. The gripper of claim 5, wherein a distance from a lower surface of the frame to a lowermost end of the inner gripper portion when the moving block moves to an outermost position in the radial direction is less than a distance from the lower surface of the frame to the lowermost end of the inner gripper portion when the moving block moves to an innermost position in the radial direction.

13. The gripper of claim 2, wherein the inner gripper portion is fixedly connected to the moving block on one end, and has a bent portion bent inwardly in the radial direction on the other end.

14. The gripper of claim 13, wherein the first hinge of the outer gripper portion is connected to the moving block through a link, and the outer gripper portion is hingedly connected to a first pin installed on the frame in a position spaced apart from the first hinge.

15. A gripper comprising:

a frame;

a driving unit connected to the frame;

a plurality of gripper portions connected to the driving unit and including an inner gripper portion and an outer gripper portion; and a rotating plate provided inside the frame and connecting the driving unit and the plurality of gripper portions, wherein the frame includes a guide portion extending in a radial direction from a rotation axis of the rotating plate and guiding movement of the gripper portions, the gripper portions include a moving block moving along the guide portion by driving the driving unit, and the inner gripper portion and the outer gripper portion connected to the moving block, the outer gripper portion is provided with a first hinge on one end connected to the moving block, and is provided with a bent portion bent inwardly on the other end, the inner gripper portion is provided with a bent portion bent inwardly, and the outer gripper portion is connected to a first pin located lower than the first hinge such that the bent portion of the outer gripper portion rises when the moving block moves inwardly in the radial direction.

16. The gripper of claim 15, wherein the inner gripper portion is provided with a second hinge on one end connected to the moving block, and is provided with the bent portion on the other end, and the frame includes a guide pin located lower than the second hinge such that the bent portion of the inner gripper portion rises when the moving block moves outward in the radial direction.

17. The gripper of claim 16, wherein the outer gripper portion is provided along an extension direction of the outer gripper portion and includes a through-groove through which the first pin passes, and the first pin is connected to the frame.

18. A probe card transfer device comprising:

a device body;

a gripper moving portion provided on the device body, connected to a gripper, and moving the gripper;

the gripper of claim 1 connected to the gripper moving portion; and a traveling unit provided on a lower portion of the device body.

* * * * *